United States Patent [19]
Hall et al.

[11] 3,984,509
[45] Oct. 5, 1976

[54] EXTRUSION PROCESS FOR MIXTURES OF ELASTOMER PARTICLES AND RESIN PARTICLES

[75] Inventors: Joseph J. Hall, Bridgewater; Ralf Korpman, Somerville, both of N.J.

[73] Assignee: Johnson & Johnson, New Brunswick, N.J.

[22] Filed: June 30, 1975

[21] Appl. No.: 591,796

[52] U.S. Cl. ............................. 264/40.1; 156/244; 260/27 BB; 260/29.7 R; 260/32.8 R; 264/171; 264/176 R; 264/211; 427/207 R
[51] Int. Cl.² ...................... B29B 3/02; B29H 9/00
[58] Field of Search ............... 264/176 R, 171, 211, 264/349, 40; 260/29.7 R, 27 BB, 32.8 R; 425/207, 208, 376, 378; 428/355; 427/207; 156/244

[56] References Cited
UNITED STATES PATENTS

| | | | |
|---|---|---|---|
| 2,541,201 | 2/1951 | Buecken et al. | 264/349 |
| 3,160,915 | 12/1964 | Wallace et al. | 264/176 R |
| 3,239,478 | 3/1966 | Harlan, Jr. | 428/355 |
| 3,398,014 | 8/1968 | Turner | 427/207 |
| 3,592,710 | 7/1971 | Yurgen et al. | 156/153 |
| 3,634,574 | 1/1972 | Reinking et al. | 264/176 R |
| 3,744,770 | 7/1973 | Ocker | 259/192 |
| 3,767,754 | 10/1973 | Manning et al. | 264/349 |
| 3,783,072 | 1/1974 | Korpman | 260/29.7 R |
| 3,929,323 | 12/1975 | Smith | 259/192 |

OTHER PUBLICATIONS

Fisher—*Extrusion of Plastics*, – Iliffe Books Ltd., New York, Interscience Publishers, June–1964–pp. 89–90.

*Primary Examiner*—Jeffery R. Thurlow

[57] ABSTRACT

A process for extruding thermoplastic elastomeric film using a single screw extruder to extrude a particular type of a potentially sticky dry particulate mixture comprising relatively high molecular weight thermoplastic elastomer particles and relatively low molecular weight resin particles wherein the particulate mixture is fed starved, advanced axially, and prevented from sticking to the screw by mechanically displacing the mixture rotatively with respect to the screw in a prescribed portion of the feed section of the extruder, thereby preventing surging or uneven extrusion due to irregular feeding of the potentially sticky mixture.

8 Claims, 5 Drawing Figures

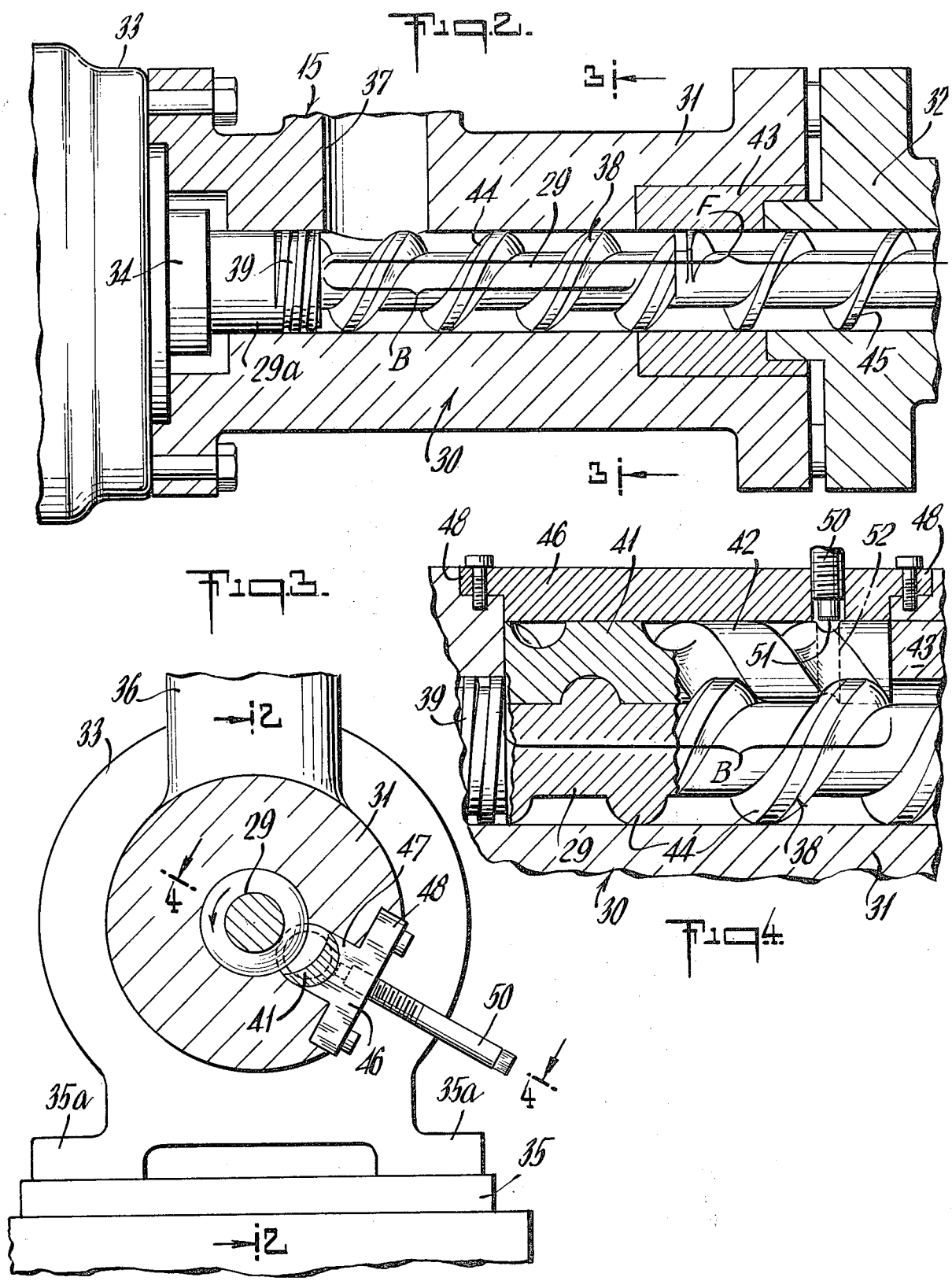

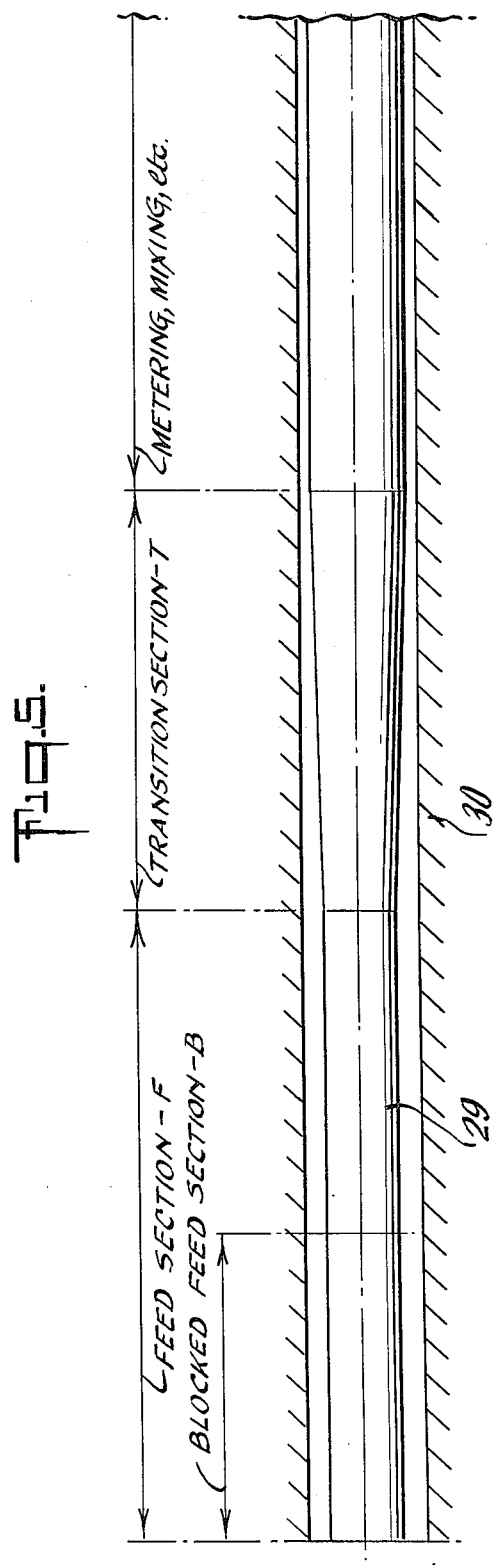

EXTRUSION PROCESS FOR MIXTURES OF ELASTOMER PARTICLES AND RESIN PARTICLES

The present invention relates to processes for producing adhesive tapes and sheets from thermoplastic elastomeric materials and generally to processes for producing films or sheets from thermoplastic elastomeric block copolymers without the use of solvents.

U.S. Pat. No. 3,783,072 discloses an extrusion process for pressure-sensitive adhesive sheets and tapes wherein the adhesive is melted in an extruder and laminated to a backing sheet as a hot drawn film without using solvents. The process of this invention is both an improvement on, and an expansion of, the process of that patent.

U.S. Pat. No. 3,783,072 describes charging the extruder with a blended mixture of dry thermoplastic elastomeric block copolymer particles and dry tackifier resin particles. While the process described has been responsible for a major breakthrough in the art of manufacturing pressure-sensitive adhesive products, difficulties have been encountered in practice due to nonuniform feeding, and surging or extrusion at nonuniform rates. This may result in undesirable variations in the dimensions and quality of the extrudate film and may even jam the extruder. We have discovered that this problem relates to the use of a mixture of high and low molecular weight elastomer and resin particles and that this mixture of high molecular weight block copolymer particles and low molecular weight resin particles tends to agglomerate and stick to the flights of the extruder screw as the screw rotates in the inlet portion of the feed section of the extruder.

It therefore, is an object of this invention to prevent the particulate mixture of high molecular weight elastomeric particles and low molecular weight resin particles from sticking to the extruder in the feed section of the extruder.

More generally, it is the principal object of this invention to provide an extrusion process for the above-described mixture of high and low molecular weight particles which will advance the mixture in a uniform fashion so as to eliminate surging and therefore produce an extrudate of uniform dimensions and quality.

In a single screw extruder feeding a particulate mixture, the mixture sticks or adheres to the inside surfaces of the barrel. As the screw rotates the mixture is, in a sense, scraped or wiped rotatively from the inside of the barrel by the rotating helical flights of the screw and caused to slide helically along the flights in such a way that the mixture can be said to have rotative and axial components of motion. Of course it is the axial component of motion which moves the mixture axially or lengthwise of the screw in the extruder barrel. It is believed that when a particulate mixture of the type used in this invention, i.e., relatively high molecular weight thermoplastic elastomeric block copolymer particles and relatively low molecular weight resin particles, begins to agglomerate in the feed section of the extruder it tends to stick to the threads or flights of the extruder screw as described above, and thereby loses its axial component of motion. Furthermore, the agglomerated mixture tends to fill up the screw channel between the flights in the feed section and thus clogs the extruder.

The process of the present invention overcomes this problem by mechanically displacing the mixture of high and low molecular weight elastomeric and resin particles rotatively with respect to the flights of the feed screw or wiping the mixture off the flights while causing the mixture to move axially forward in the extruder uniformly at a predetermined feed rate in the inlet portion of the feed section of the extruder. To accomplish this, the particulate mixture is fed into the feed section of the extruder at the desired predetermined feed rate, i.e., weight per unit of time, and this rate is maintained constant so as to assure a constant predetermined feed and extrusion rate for the extruder. To assure that the particulate mixture is advanced in the feed section of the extruder, the mixture is forced to move axially forward or longitudinally of the screw in the prescribed inlet portion of the feed section of the extruder as it is mechanically displaced rotatively with respect to, or wiped off, the flights of the feed screw.

Preferably, the particulate mixture is displaced rotatively, as described, by blocking means which inhibits further rotative movement of the mixture with the screw and thereby wipes the mixture off the flights in the inlet portion of the feed section of the extruder, and preferably the blocking means for this purpose is a short helical screw meshing with the feed screw in the prescribed portion of the feed section. Preferably also, the rotative motion of the agglomerated mixture is completely converted to axial motion in this portion of the feed section. This increases the feeding pressure in the extruder barrel beyond the blocking means with the result that the further melted mixture again acquires rotative and axial components of motion as it is fed forward helically in the extruder barrel beyond the blocking means. The blocking means preferably extends through the prescribed portion of the feed section of the extruder and terminates at or beyond the point where sufficient pressure is created in the extruder barrel to overcome the tendency of the melting mixture to stick to the extruder screw and allow it to be advanced helically in the barrel at a uniform rate.

To assure that the process will continue to operate without surging or blocking of the extruder, the predetermined feed rate at which the particulate mixture is fed through the extruder is substantially less than the maximum capacity of the adjacent transition section of the extruder to feed the mixture forward. Preferably the said predetermined feed rate is substantially less than the maximum capacity of the feed section to feed or advance the mixture forward. Thus the process of this invention employs starved feeding in the transition section and preferably starves both the feed section and the transition section of the extruder.

This may be accomplished by employing particle feeding means which feeds the particulate mixture at the predetermined rate into the inlet of the extruder. Preferably controlled blending means is employed to feed various components of the mixture at a predetermined constant feed rate for that material from a supply of each material to a common blending and feeding means or device which, in turn, feeds the blended mixture into the extruder at the aforesaid predetermined rate. As indicated hereinbefore, it is important that this feed rate be maintained constant.

The particulate mixture of this invention preferably consists essentially of a mixture of dry thermoplastic elastomer particles and dry resin particles. However, the basic mixture may contain relatively small quantities of various other materials such as antioxidants, heat stabilizers and ultraviolet absorbers, release agents, and the like. Typical antioxidants are 2,5 ditertiary amyl hydroquinone and tertiary butyl cresol. Similarly, conventional heat stabilizers such as the zinc salts of alkyl dithiocarbamates may be used. Lecithin is one release material which has been found to be particularly suitable in minor amounts in this type of extrudable particulate mixture. However, waxes and various other release agents also may be added in this manner. Similarly, the particulate mixture of this invention may include minor amounts of fillers and pigments such as zinc oxide, aluminum hydrate, clay, calcium carbonate, titanium dioxide, carbon black and others. Many of these fillers and pigments also may be used in powdered form as parting agents to be mixed with the thermoplastic elastomer particles to prevent these particles from agglomerating prior to blending with the resin particles and other materials.

As indicated above and as will be described more fully hereinafter, the particulate mixture may be preblended or it may be blended and mixed just prior to entering the extruder itself. In either case it is important that the compositon of the mixture be carefully controlled and that the rate of feeding the blended mixture into the feed section of the extruder be maintained constant at a predetermined level or rate. The particulate mixture of this invention contains about 25–75 percent air. The amount of air in the mixture is a function of the size, shape, regularity or uniformity, porosity and packing of the particles. Generally speaking, the more all of the particles approach spheres of uniform size, the less air will be present, assuming maximum packing. Particle size may vary as indicated in U.S. Pat. No. 3,783,072 and maximum particle size is limited by the depth of the screw flights in the feed section of the extruder and the clearance between the extruder barrel and the screw shaft between flights as will be explained more fully hereinafter together with removal of the air from the mixture in the extruder barrel. Typically, in the process of this invention, the elastomer particles are preblended with a parting agent but the major constituents of the particulate mixture, i.e., thermoplastic elastomer particles and the resin particles are blended with one another, and with the antioxidant and stabilizer particles which may be employed, just prior to feeding the final particulate mixture into the feed section of the extruder. Various techniques for accomplishing this also will be described more fully hereinafter.

The particulate mixture of this invention at least consists predominantly of a mixture of dry thermoplastic elastomer particles and about 20–300 parts of dry resin particles per one hundred parts by weight of the total elastomer particles. As indicated hereinbefore, the elastomer particles possess a relatively high number average molecular weight, i.e., at least about 75,000, preferably at least about 100,000; whereas the resin particles have a relatively low molecular weight, i.e., not above about 3,000 and normally have a melting point above about 60° C.

Preferably, the thermoplastic elastomer particles consist essentially of:
1. a linear or radial A-B-A block copolymer wherein the A blocks are derived from styrene and the B blocks are derived from a conjugated diene or a copolymer of ethylene and butylene, or
2. an A-B block copolymer wherein the A blocks are derived from styrene and the B blocks are derived from a conjugated diene, or
3. an ethylene vinyl acetate copolymer, or
4. a mixture of any of the copolymers from two or more of the categories (1), (2), or (3) above.

However, minor amounts of more conventional diene rubber elastomers may be utilized if they can be reduced to extrudable condition. These include natural rubbers, synthetic rubbers based on butadiene, isoprene, butadiene-styrene and butadiene acrylonitrile, and butyl rubber and other elastomers. Thus, at least a major amount of the elastomer particles consist of (1), (2), (3) or (4) above, (by weight of the total elastomer particles) whereas no more than minor amounts of the conventional diene rubber elastomers may be employed (also by weight of the total elastomer particles).

The A-B-A block copolymers useful in the elastomer particles of this invention may be linear or radial A-B-A block copolymers of the type which comprises an elastomeric B-block (center block) derived from a conjugated diene such as butadiene or isoprene, i.e., polymerized from butadiene, isoprene or the like, either alone or in conjunction with a small proportion of other monomers, or derived from a copolymer of ethylene and butylene; and thermoplastic A-blocks (end blocks) derived from styrene, i.e., polymerized from styrene or styrene homologues. The individual A-blocks have a number average molecular weight of at least about 7,000 preferably in the range of about 12,000–30,000, and the A-blocks preferably constitute about 5–50 percent by weight of the block copolymer.

The radial A-B-A polymers useful in this invention are of the type described in U.S. Pat. No. 3,281,383 and conform to the following general formula: $(A-B)_nX$, wherein A is a thermoplastic block polymerized from styrene or styrene homologues, B is an elastomeric block polymerized from a conjugated diene such as butadiene or isoprene, X is an organic or inorganic connecting molecule, with a functionality of 2–4 as described in U.S. Pat. No. 3,281,383 or with a higher functionality as described in the article entitled "New Rubber is Backed by Stars" appearing on page 35 of the June 11, 1975 issue of *Chemical Week*. n then is a number corresponding to the functionality of $x$; i.e., 2–4 as described in U.S. Pat. No. 3,281,383 or up to 22 as described in the above article.

The A-B block copolymers of this invention are of the type wherein the A-blocks are derived from styrene or styrene homologues and B-blocks are derived from conjugated dienes either alone or in conjunction with small proportions of other monomers. These A-B block copolymers are described in U.S. Pat. Nos. 3,519,585 and 3,787,531.

The dry resin particles of this invention may include hydrocarbon resins, such as the polymerized mixed olefin type, esters of hydrogenated rosin and stabilized rosin, polyterpene resins, certain phenolic resins, coumarone indene, alphamethyl styrene, and various other resins of the type generally disclosed in column 5 of U.S. Pat. No. 3,239,478.

Trace amounts of liquid components may be preblended into the polymer particles. However, the preferred technique is to pump any liquid components into the barrel beyond the transition section of the extruder. In this manner, liquid components such as oils, liquid tackifiers, or plasticizers may be added.

The process of this invention is adapted to produce a wide variety of products which may be formed from or which may incorporate, a thermoplastic elastomeric film. The extruded thermoplastic elastomeric film of this invention normally is not above about 50 mils in thickness and preferably is below 20 mils thick. The film may be in the form of a self-supporting film which is adhesive or nonadhesive. If the former, it may be pressure sensitive or normally tacky or it may be nontacky and heat sensitive. Since pressure-sensitive adhesives normally are coated on nontacky backing sheets, the process of this invention also may be used for extruding a film of pressure-sensitive adhesive and then laminating the adhesive while hot onto a backing sheet which, in turn, may be paper, polymeric film, foil, or the like, and may contain reinforcing strands or other materials or may be laminated with several sheets or layers of the same or different materials. Various nontacky and nonadhesive extruded films of this invention also may be laminated in various ways with various sheet materials to form a variety of products according to this invention.

Other and further features of this invention will be apparent to one skilled in the art from the following description, examples, and claims taken together with the drawings wherein:

FIG. 2 is a longitudinal sectional view, partly in elevation, showing the feed section of the extrusion apparatus of FIG. 1 and the feed section portion of the helical extruder screw of this embodiment of the invention.

FIG. 3 is a transverse view, partly in section and partly in elevation, taken along the line 3—3 of FIG. 2.

FIG. 4 is a longitudinal sectional view taken along the line 4—4 of FIG. 3.

FIG. 5 is a schematic view of a portion of the extruder screw and extruder barrel of the extruder of the foregoing embodiment with the screw flights removed to illustrate certain relationships between the feed section and the transition section of the extruder.

Figure 1:
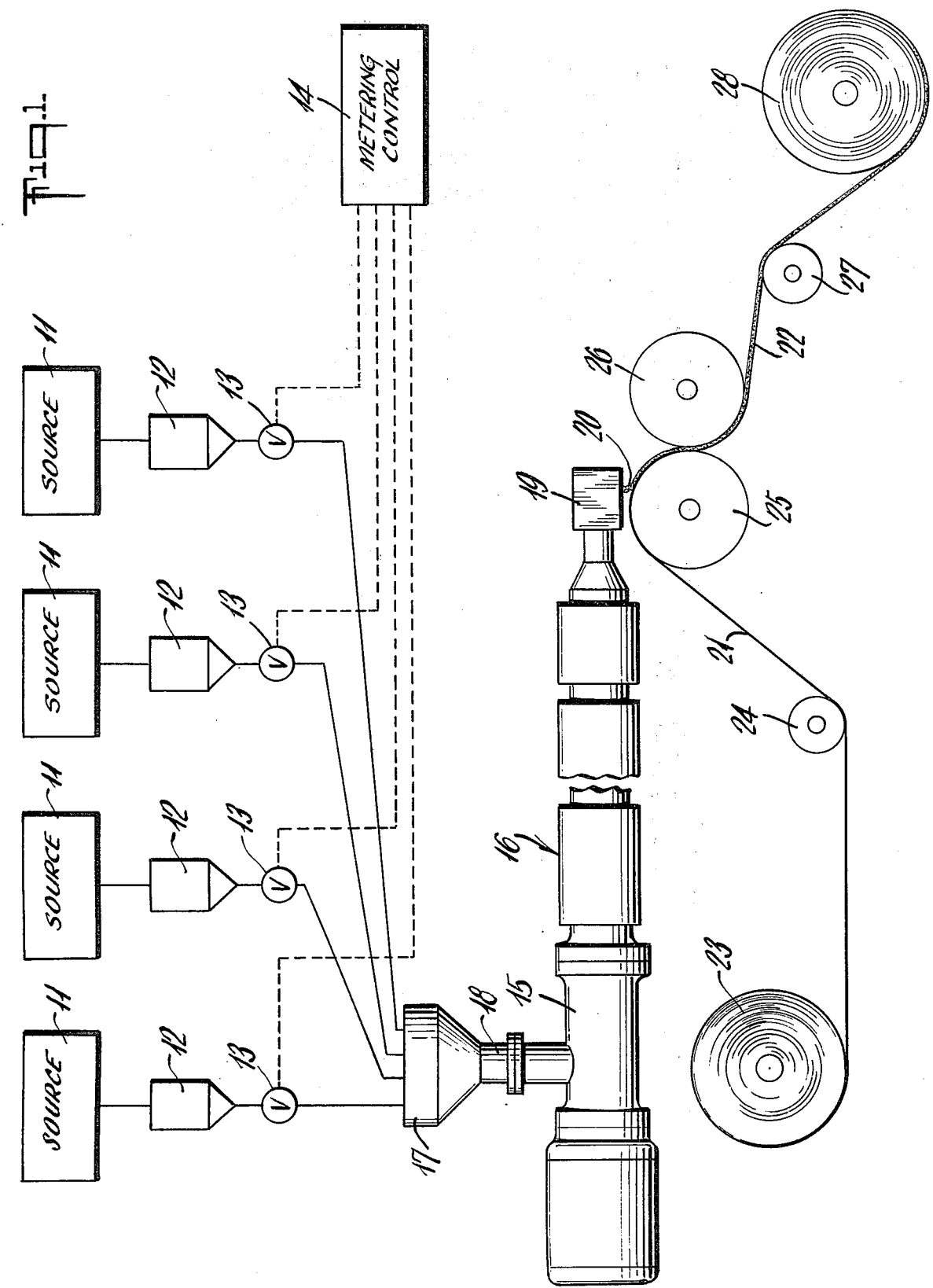
FIG. 1 is a diagramatic elevational view of a preferred embodiment of apparatus for performing the process of this invention.

Referring to the drawings, and in particular to FIG. 1 thereof, there is shown portions of preferred apparatus for performing the process of this invention in accordance with a preferred embodiment thereof. In this embodiment of the process of this invention, the thermoplastic and elastomeric film is extruded hot in the form of a normally tacky and pressure-sensitive layer 20 which is laminated (while hot) with a backing sheet 21 to form a pressure-sensitive adhesive sheet or tape 22.

In this process, the components of the particulate mixture to be fed into the extruder are drawn from sources of supply or storage containers 11 into a series of feed hoppers 12 from which they are fed by individually controlled or metered feeding devices 13 into the feed section 15 of an extruder 16 according to this invention. A metering control 14 is used to regulate the feeding devices 13 so as to assure that there is constant weight feeding control for each of the components of the mixture. Various kinds of constant speed feeding devices such as conveyor belts may be employed between the hoppers 12 and the extruder. Preferably, gravimetric weight control devices are employed in conjunction with each of the hoppers 12 to assure constant weight feeding. In any event, the material coming from each of the hoppers 12 is fed into an inlet hopper 17 for the extruder at a predetermined constant feed rate for that material. While it is not necessary to use four feed hoppers 12 as shown, at least three normally are employed in the process of this invention. One hopper 12 is used for the thermoplastic elastomer particles, another hopper is used for the resin particles, and at least a third hopper is used for whatever antioxidants and stabilizers are to be added to the mixture. Thermoplastic elastomer particles which tend to be somewhat tacky under normal conditions normally are dusted with a powdered parting agent prior to entering one of the hoppers 12. However, no such dusting is necessary if the thermoplastic elastomer particles are nontacky. If necessary, the fourth feed hopper 12 shown may be employed or additional feed hoppers, not shown, may be used for other materials to be added to the mixture. These components entering the inlet hopper 17 then are blended or mixed together in an inlet conduit or static mixer 18 through which the blended mixture is fed into the feed section 15 of the extruder through the throat 37 of a feed pipe 36 extending from the feed section of the extruder.

In this embodiment of the process of this invention, the particulate mixture is fed into the extruder at a constant predetermined feed rate (by weight of the mixture) by controlling the individual feed rates of each of the components of the mixture. This is accomplished through the metering devices 13 which are operated by the metering control 14 as described hereinbefore. Obviously, the feeding capacity of the static mixer 18 must be greater than the combined input from the feed hoppers 12 in order to control feed rate weight by these means.

The extrusion process of this invention is capable of operating at relatively high speeds. In FIG. 1, the hot extrudate film 20 is drawn from the extruder die 19 by virtue of its lamination with the backing sheet 21 to form the coated sheet or tape 22 as indicated hereinbefore. The coating weight of lamination is determined both by the rate of extrusion from the extruder die 19 and the rotative speed of the driven coating roll 25 which carries the backing sheet 21 under and into contact with the extrudate film 20. A pressure or pin roll 26 cooperates with the coating roll 25 to draw the extrudate film 20 and the backing sheet 21 together to form the laminated sheet 22. The backing sheet is drawn from a supply roll 23 around a guide roll 24 and thence over the coating roll 25 and into contact with the extrudate. The coated sheet 22 is led from the pin roll 26, which also acts to press the cooling extrudate into contact with the backing sheet, over a second guide roller 27 to a windup roll 28 where it is stored for subsequent processing if necessary.

Referring now to FIGS. 2-4 of the drawings, certain specific features of a preferred apparatus for feeding the particulate mixture in accordance with the process of this invention are illustrated. The feed portion of a helical extruder screw 29 is shown inside the extruder barrel 30. The barrel is made up of a water cooled feed adapter housing 31 bolted to a barrel adapter 32. The feed adapter housing 31, in turn, is bolted to a gear box 33 which contains a driven gear train, not shown, which drives a hollow output shaft 34. A large diameter drive portion 29a of the feed screw 29 is inserted into the output shaft 34 and keyed thereto in such a way that the output shaft 34 drives the screw rotatively counterclockwise in FIG. 3.

The gear box is mounted on a foundation 35 through mounting feed 35a. The remainder of the extruder barrel 30 is supported by means not shown. In fact, it is not necessary for the purpose of this invention to illustrate the extrusion apparatus any further than is shown in FIGS. 2–4 and in the schematic view of FIG. 5 which illustrates the relationship between the Feed Section F of the extruder and the Transition Section T, as well as whatever subsequent sections may be employed for metering, mixing, etc.

As explained hereinbefore, in a single screw extruder feeding a particulate mixture, the mixture normally enters the barrel 30 through the feed throat 37 and comes into rotative driving contact with the helical flights or threads 38 of the screw 29 and is turned into the barrel and fed axially forward in the extruder with the flights as the screw rotates. In the apparatus shown, both the feed pipe 36 and the feed adapter housing 31 are water cooled. This prevents the mixture from sticking to the sides of the throat 37. However, in the process of this invention the two main constituents of the particulate mixture, i.e., the relatively high molecular weight thermoplastic elastomer particles and the relatively low molecular weight resin particles tend to agglomerate as soon as they strike the heated extruder screw 29 and thus stick to the screw. As indicated hereinbefore, this condition results in uneven feeding, surging of the extrudate, and even jamming of the extruder. According to this invention the particulate mixture is displaced rotatively with respect to the flights of the screw as the screw rotates in the feed section to prevent the mixture from sticking to the screw. This mechanical displacement is accomplished in this embodiment of the invention by a helical wiper screw 41 which blocks continued rotative motion of the particulate mixture with the screw and thereby causes it to move axially or longitudinally forward in a prescribed portion of the feed section of the extruder which is illustrated by the bracket B (corresponding to the length of the wiper screw 41). This also is shown in FIG. 5 as Blocked Feed Section-B. It will be seen that the wiper screw 41 is positioned approximately 225° counterclockwise from top dead center of the feed screw so that the screw 41 wipes the mixture from the sides of the flights 38 of the extruder screw 29 and opens up the channel or space between the flights so that the screw again is relatively empty in the Blocked Feed Section-B as it comes under the inlet throat 37, and therefore again is ready to receive the particulate mixture and maintain a constant feeding rate through the extruder. In the Blocked Feed Section-B, the wiper screw meshes closely with the flights of the feed screw. For this purpose, the wiper screw 41 possesses flat helical threads 42 which conform to the shape of the specially designed teeth 44 of the feed screw in the blocked section. For instance, the shape of the teeth or flights 45 beyond the Blocked Feed Section-B may be quite different than is required to mesh with the wiper screw, as shown. While the feed screw 29 is driven as described hereinbefore, the wiper screw 41 is turned by virtue of its contact with the flights 38 of the feed screw. To prevent the wiper screw from moving forward axially as the feed screw rotates a hardened annular bearing plate 43 is provided to act as a thrust bearing which prevents axial movement of the wiper screw 41. A helical groove 39 is provided around the trailing end of the drive portion 29a of the extruder screw 29 to act as a sealing device which tends to counteract the tendency of the melting particles to pass into the gear box around the extruder screw.

A combined access plate 46 and housing 47 is bolted to a cut out portion of the feed adapted housing 31 through a flange 48 integral with the access plate 46. The housing 47 has the same length as the wiper screw 41 and fits around the wiper screw in such a way as to retain the wiper screw 41 in proper meshing relationship with the specially designed teeth 44 of the extruder screw 29 in the Blocked Feed Section-B of the extruder. A safety plug in a form of a rod 50 is threaded into a corresponding hole in the access plate 46 and housing 47 to enter the space occupied by the wiper screw 41. The safety plug 50 has a drilled quarter inch diameter axial hole, not shown, along its centerline and this hole is blocked by a rupturable membrane 51 at its inner tip as shown in FIG. 4. An annular recess 52 is provided in the teeth 42 of the wiper screw in axial alignment with the plug 50 to assure that the rupturable membrane 51 is exposed to pressures which are representative of conditions in this section of the extruder. Thus, the membrane 51 only should rupture if the pressure inside the extruder in that area exceeds the desired value.

In operation, the particulate mixture is fed into the extruder through the water cooled throat 37 as described hereinbefore and into rotative driving contact with the flights 38 (44) of the screw 29 and is rotated into contact with the threads 42 of the wiper screw 41. The wiper screw mechanically displaces the mixture rotatively, or blocks further rotative movement of the mixture with the flights of the screw 29 and thus forces the mixture to move axially forward in the extruder barrel as the flights 38 continue to rotate. As a result, the softening sticky mixture of the relatively high molecular weight thermoplastic elastomer particles and relatively low molecular weight resin particles is positively fed axially forward in the Blocked Feed Section-B. When the mixture passes the forward end of the wiper screw 41, it continues to be thrust forward in the remaining portion of the Feed Section-F by newly arriving mixture passing beyond the end of the wiper screw 41. As the mixture is moved forward in this manner, further melting occurs and it is believed that the mixture is prevented from sticking to the flights in the Transition Section-T because the flights contact predominantly only the melted particles. An important aspect of the process of this invention is that the feed rate of the particles into and through the extruder be maintained constant and at a predetermined level which is below the capacity of the Transition Section-T to feed the mixture forward. Thus, the transition section is said to be starved, in that it is not operated at its full capacity. With the type of extruder screw 29 shown schematically in FIG. 5 (and in the foregoing drawings) the feed section also should be starved, i.e., the predetermined feed rate into the feed screw should be less than the capacity of the feed section to feed the mixture forward. For best results in this connection, it is believed that the feed screw shown should be starved to the point where it is operated at not above about 75 percent of its capacity.

As indicated hereinbefore, the air is expelled from the mixture as the mixture progresses through the extruder. In this embodiment of the invention most of the air is expelled backwards through the extrusion barrel and out the feed pipe 36 through the throat 37. However, means may be provided for bleeding off air at other points in the extruder.

It should be noted that further sections of the extruder are not shown but only are referred to schematically in FIG. 5 by the designation "metering, mixing, etc." Similarly, the extruder die 19 connected to the extruder 16 only is shown generally in FIG. 1, since the details of its operation are not relevant to this invention except to say that if the die is properly adjusted the process of this invention makes it possible to feed uniform films of thermoplastic elastomeric material at a uniform rate with excellent control of process weight, thickness, uniformity of dimensions, etc.

The following examples are given only by way of illustration and are not intended to limit the scope of the invention in any way. Table A gives the extrudate formulations for Examples I–VIII and Table B gives the formulations for Examples IX–XII. Both tables indicate extrudate thickness and throughput for each example. In the examples, all proportions are given in parts per 100 parts by weight of the total thermoplastic elastomer particles unless otherwise shown.

sition Section-T of the extruder. As indicated hereinbefore, the extruder barrel in the feed section of the extruder is water cooled and the helical extruder screw 29 is internally heated. While the extrusion conditions are generally similar to those disclosed in U.S. Pat. No. 3,783,072, it can be said that the screw temperature in the feed section is maintained well above the melting point of the resins employed, i.e., at least about 50°–100° Fahrenheit, or more, above melting which would be in the neighborhood of 250° F or more.

Each of Examples I–VII are processed as described hereinbefore in accordance with this invention. The particulate mixtures of Table I are fed into the extruder at a constant predetermined feed rate which for Examples I–VI is 600 lbs./hr., and then are fed forward in the extruder, mixed, melted and extruded at a uniform

TABLE A

| Ingredients - Etc. | I | II | III | IV | V | VI | VII | VIII |
|---|---|---|---|---|---|---|---|---|
| Kraton 1107 S-I-S Linear Block Copolymer | 100 | | | | 70 | | | |
| Kraton 1102 S-B-S Linear Block Copolymer | | 100 | | | | | | |
| Solprene 418X Radial Block Copolymer (SIS) | | | 100 | | | | | |
| Solprene 411 Radial Block Copolymer (SBS) | | | | 100 | | | | |
| Solprene 1205 S-B Linear Block Copolymer | | | | | 30 | | | |
| Solprene 6131 CD S-I Linear Block Copolymer | | | | | | 100 | | |
| Kraton G1650 S-PB-S Linear Block Copolymer | | | | | | | 100 | |
| EVA No. 105 Ethylene Vinyl Acetate Copolymer | | | | | | | | 100 |
| Wingtack 95 Solid Resin | 80 | | | | 50 | 40 | 100 | |
| Wingtack 76 Solid Resin | | 70 | | | | | | |
| Piccolyte S115 Solid Resin | | | 60 | | | | | |
| Super-STATAC 80 Solid Resin | | | | 80 | | | | |
| Foral 105 Solid Resin | | | | | | | | 80 |
| Cumar 509 LX Solid Resin | | | | | 30 | | | |
| Wingtack 10 Liquid Resin | | | | | | | 50 | |
| Staybelite Ester No. 3 Liquid Resin | | | | | | | | 20 |
| Zinc Dibutyl Dithiocarbamate (Antioxidant) | 2 | 2 | 2 | 2 | 2 | 2 | 2 | 2 |
| 2,5 Ditertiary Amyl Hydroquinone (Antioxidant) | 0.5 | 0.5 | 0.5 | 0.5 | 0.5 | 0.5 | 0.5 | 0.5 |
| Thickness of Extrudate (Mils) | 1.0 | 1.5 | 1.5 | 1.5 | 2.0 | 1.5 | 2.0 | 1.5 |
| Throughput of Extrudate lbs./hr. | 600 | 600 | 600 | 600 | 600 | 600 | 600 | 600 |

In Examples I–VIII the extrudate films are normally tacky and pressure-sensitive adhesives which are drawn from extrusion die into contact with the backing sheet and laminated therewith as described in connection with the drawings. In this regard the process is generally the same as that disclosed in U.S. Pat. No. 3,783,072 and the resulting laminated sheets may be made into pressure-sensitive adhesive tapes as described in that patent. The backing sheet for Example I is a polyethylene terephthalate film 1 mil thick and in Example II–VIII the backing is a creped kraft paper 6.5 mils thick.

Tables A and B do not indicate that approximately 5 percent by weight of the block copolymer of an aluminum hydrate powdered parting agent is dusted onto the thermoplastic elastomeric copolymer particles in Examples I, III, V, VI and IX because of the sticking characteristics of the Kraton 1107, Solprene 418X and Solprene 6131 CD particles employed. In each case the particles are pre-dusted prior to entering one of the hoppers 12 of this invention. The solid resin particles of each example are supplied to another one of the hoppers 12 as indicated hereinbefore and the two antioxidants are blended and added in still another of the hoppers 12. The liquid resins of Examples VII and VIII are pumped into the extruder downstream of the Tranthroughput rate of 600 lbs./hr. The input feed rate for the particulate mixtures of Examples VII and VII is at a constant value somewhat less than 600 lbs./hr. in order to compensate for the liquid resin which is pumped into the extruder barrel before the mixture is extruded at 600 lbs./hr. In each of these Examples the thermoplastic elastomeric material is extruded at a uniform rate with excellent control of process weight and thickness of the extrudate film both lengthwise and across the film. Lengthwise variations in the thickness of the laminated extruded film are minimal and tend to correspond with line speed variations in the unwind, laminating and windup machinery.

In each of Examples IX–XII, nontacky films are extruded and cooled to form self-supporting films of uniform properties. Extrusion conditions are generally the same as for Examples I–VIII. As indicated in Table B, particle feed and throughput rate again are maintained constant at 600 lbs./hr. Uniformity of feeding and dimensions of the extrudate film again are excellent. In these examples the extrudate is temporarily coated on a silicone coated release paper backing 21 for convenience in cooling and conveying the film and then separated therefrom and wound upon itself since the films of Examples IX–XII are nontacky.

TABLE B

| Ingredients - Etc. | IX | X | XI | XII |
|---|---|---|---|---|
| Kraton 1107 S-I-S Linear Block Copolymer | 100 | | | |
| Kraton 1102 S-B-S Linear Block Copolymer | | 100 | | 75 |
| Kraton G1650 S-PB-S Linear Block Copolymer | | | 100 | |

TABLE B-continued

| Ingredients - Etc. | IX | X | XI | XII |
|---|---|---|---|---|
| EVA No. 105 Ethylene Vinyl Acetate Copolymer | | | | 25 |
| Cumar 509 LX Solid Resin | | 50 | | |
| Amoco 18-210 Solid Resin | 25 | | | 50 |
| Piccotex 120 Solid Resin | | | 25 | |
| Zinc Dibutyl Dithiocarbamate (Antioxidant) | 2 | 2 | 2 | 2 |
| 2,5 Ditertiary Amyl Hydroquinone (Antioxidant) | 0.5 | 0.5 | 0.5 | 0.5 |
| Thickness of Extrudate (Mils) | 1.0 | 5.0 | 15.0 | 8.0 |
| Throughput of Extrudate lbs./hr. | 600 | 600 | 600 | 600 |

In the foregoing examples Kraton 1107 copolymer is a thermoplastic elastomeric A-B-A (styrene-isoprene-styrene) block copolymer of this invention offered by the Shell Chemical Company, wherein the styrene content (that of the A blocks) is about 12–15 percent, closer to 15 percent by weight of the block copolymer, and the polymer possesses a solution viscosity of about 2,000 centipoises at 25 percent solids in toluene at room temperature (using a Brookfield Viscometer with a No. 4 spindle at 60 r.p.m.), and a number average molecular weight of about 110,000–125,000. Kraton 1102 copolymer is another A-B-A block copolymer offered by Shell but this is a styrene-butadiene-styrene copolymer wherein the styrene blocks constitute about 30 percent of the copolymer. The number average molecular weight of Kraton 1102 copolymer also is about 125,000.

Solprene 411 copolymer is a radial butadiene-styrene thermoplastic elastomeric A-B-A block copolymer of the type described in U.S. Pat. No. 3,281,383, referred to hereinbefore. This copolymer contains approximately 30 percent styrene and has a Brookfield Viscosity of about 30 cps. at 5 percent solids in toluene and is offered commercially by the Phillips Petroleum Company. Solprene 418X copolymer is a similar radial copolymer offered by Phillips wherein the B block is isoprene and the A (styrene) blocks constitute about 15 percent of the copolymer.

Solprene 1205 and Solprene 6131 CD are similar A-B or simple block copolymers of the type described in U.S. Pat. Nos. 3,519,585 and 3,787,531. Solprene 1205 is an S-B or styrene-butadiene copolymer and Solprene 6131 CD as an S-I or styrene-isoprene copolymer. Both of these copolymers have a styrene content of about 15 percent and are offered commercially by the Phillips Petroleum Company.

Kraton G1650 is a different A-B-A block copolymer offered by the Shell Chemical Company wherein the A blocks are derived from styrene and the center or B block is a copolymer of ethylene and butylene. This copolymer has a solution viscosity at 25 percent solids in toluene of 12,000 cps. when measured with a Brookfield Model RVT viscosimeter. EVA No. 105 is an ethylene vinyl acetate random copolymer comprising about 60 percent ethylene and 40 percent vinyl acetate.

Wingtack 95 resin is a solid tackifier resin consisting predominantly of polymerized structures derived from piperylene and isoprene, with the ratio of piperylene to isoprene derived structures being at least about 8 or 9 to 1, and with the remainder being derived from mono-olefins. It appears to contain about 12–15 percent unsaturation based upon percentage of units in each molecule having a double bond. The said resin is polymerized from a stream of aliphatic petroleum derivatives in the form of dienes and mono-olefins having 5 or 6 carbon atoms all in accordance with the general teachings of the aforesaid U.S. Pat. No. 3,577,398. This resin possesses a softening point of about 95° C. by the ball and ring method, a number average molecular weight of about 1,100 and is offered commercially by Goodyear Tire and Rubber Company. Wingtack 76 is a similar solid tackifier resin offered by Goodyear which has a ball and ring softening point of about 76° C.

Wingtack 10 resin is a liquid tackifier resin also consisting predominantly, i.e., about 75 percent, of polymerized structures derived from piperylene and isoprene. However, this resin is liquid at 25° C. and has a number average molecular weight of about 530. It also appears to have at least about 25 percent unsaturation, as explained hereinbefore. It also contains a lesser percentage of structures derived from mono-olefins and is offered commercially by Goodyear Tire and Rubber Company as liquid Wingtack Resin.

Piccolyte S115 solid resin is a polyterpene tackifier resin offered by Hercules Chemical Company having a softening point of about 115° C. Super-statac 80 is another solid tackifier resin. It consists of polymerized mixed olefins and is offered by Reichold Chemical Company. It has a softening point of about 80° C. Foral 105 resin also is a solid tackifier resin. It is a pentaerythrital ester of highly stabilized rosin offered by Hercules Chemical Company with a melting point of 94° C. Cumar 509 LX is a solid coumarone indene resin having a softening point of about 145° C. Staybelite Ester No. 3 is a liquid tackifier resin offered by Hercules Chemical Company with a softening point of about 10° C. It is a glycerol ester of hydrogenated rosin. Amoco 18-210 is a solid polyalphamethylstyrene offered by Amoco Chemical Company with a softening point of about 210° C. Piccotex 120 resin is a polyalphamethylstyrene-vinyl toluene copolymer offered by Hercules Chemical Company with a melting point of 120° C.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

What is claimed is:

1. The process of extruding a thermoplastic elastomeric layer from a mixture of dry particles using a single screw extruder having a feed section and an adjacent transition section and having a 20-300 extruder screw rotating within an extruder barrel, which comprises; feeding a mixture of dry particles having an air content of about 25–75 percent at a predetermined constant feed rate into the feed section of the extruder and into rotative driving contact with said screw, said predetermined feed rate into the feed section being substantially less than that which would exceed the maximum capacity of the transition section of said extruder to feed the mixture forward and thereby providing starved feeding in the said transition section, said mixture consisting predominantly of dry thermoplastic elastomer particles and about 20-300 parts per one hundred parts by weight of the total elastomer particles of dry resin particles, said elastomer particles having a relatively high molecular weight and said resin particles having a relatively low molecular weight, said relatively high molecular weight elastomer particles and said relatively low molecular weight resin particles being blended in predetermined constant proportions in the mixture; mechanically displacing said mixture rotatively with respect to the flights of the screw with blocking means positioned between the flights in a prescribed longitudinal portion of the feed section of the extruder to prevent the mixture from sticking to the screw while forcing the mixture to move axially forward uniformly at said predetermined feed rate, said longitudinal portion of the feed section terminating at or beyond the point where sufficient pressure is created to prevent the mixture from sticking to said screw; feeding said mixture forward in said barrel under substantially steady-state pressure conditions while thoroughly mixing and melting the mixture to cause it to become homogeneous and essentially free of air; and passing the melted homogeneous mixture through an elongated extrusion die to form a thermoplastic elastomeric film not above about 50 mils in thickness.

2. A process according to claim 1, wherein the elastomer particles have a number average molecular weight of at least about 75,000 and the resin particles have a number average molecular weight of not above about 3,000.

3. A process according to claim 1, wherein said blocking means is a helical screw meshing with said feed screw.

4. A process according to claim 1, wherein the feed rate of said mixture into said feed section is independent of the speed of rotation of the extruder screw.

5. A process according to claim 1, wherein said mixture comprises particles of different materials and the particles of each material are fed at a predetermined constant feed rate for that material from a supply of each material to a common feeder wherein the particles mix and are fed into the extruder at the aforesaid predetermined constant feed rate for said mixture.

6. A process according to claim 1, wherein a liquid additive is fed into the extruder barrel axially downstream of the prescribed longitudinal portion of the feed section and thenceforth mixes with the particulate mixture.

7. A process according to claim 1, wherein said elastomer particles consist essentially of:
A. at least a major amount by weight of the total elastomer particles of,
  1. a linear or radial A-B-A block copolymer wherein the A blocks are derived from styrene and the B blocks are derived from a conjugated diene or a copolymer of ethylene and butylene, or
  2. an A-B block copolymer wherein the A blocks are derived from styrene and the B blocks are derived from a conjugated diene, or
  3. an ethylene vinyl acetate copolymer, or
  4. a mixture of any of the copolymers from two or more of the categories (1), (2) or (3) above, and
B. no more than a minor amount by weight of the total elastomer particles of diene rubber elastomers selected from the group consisting of natural rubbers, synthetic rubbers based on butadiene, isoprene, butadiene-styrene and butadiene acrylonitrile, butyl rubber and other block copolymers based on such diene rubber elastomers.

8. A process according to claim 7, wherein at least a major amount by weight of the total elastomer particles consists of:
  1. a linear or radial A-B-A block copolymer wherein the A blocks are derived from styrene and the B blocks are derived from a conjugated diene, or
  2. a mixture of an A-B-A block copolymer of category (1) of this claim with 0–300 parts per one hundred parts of the A-B-A block copolymer of the said category (1) of an A-B block copolymer wherein the A blocks are derived from styrene and the B blocks are derived from a conjugated diene.

* * * * *

UNITED STATES PATENT AND TRADEMARK OFFICE
CERTIFICATE OF CORRECTION

PATENT NO. : 3,984,509
DATED : October 5, 1976
INVENTOR(S) : Hall & Korpman

It is certified that error appears in the above-identified patent and that said Letters Patent are hereby corrected as shown below:

In the Abstract, line 1, the word "film" should read -- films --.

In Column 12, line 61, the numbers "20-300" should read --helical--.

Signed and Sealed this

First Day of February 1977

[SEAL]

Attest:

RUTH C. MASON
*Attesting Officer*

C. MARSHALL DANN
*Commissioner of Patents and Trademarks*